3,350,615
SPEED-CONTROLLED DIRECT-CURRENT
MOTOR WITH CENTRIFUGAL SWITCH
Josef Lindner, Theresienplatz 8, Nurnberg, Germany
Filed May 25, 1964, Ser. No. 369,693
Claims priority, application Germany, May 30, 1963,
W 34,618
5 Claims. (Cl. 318—325)

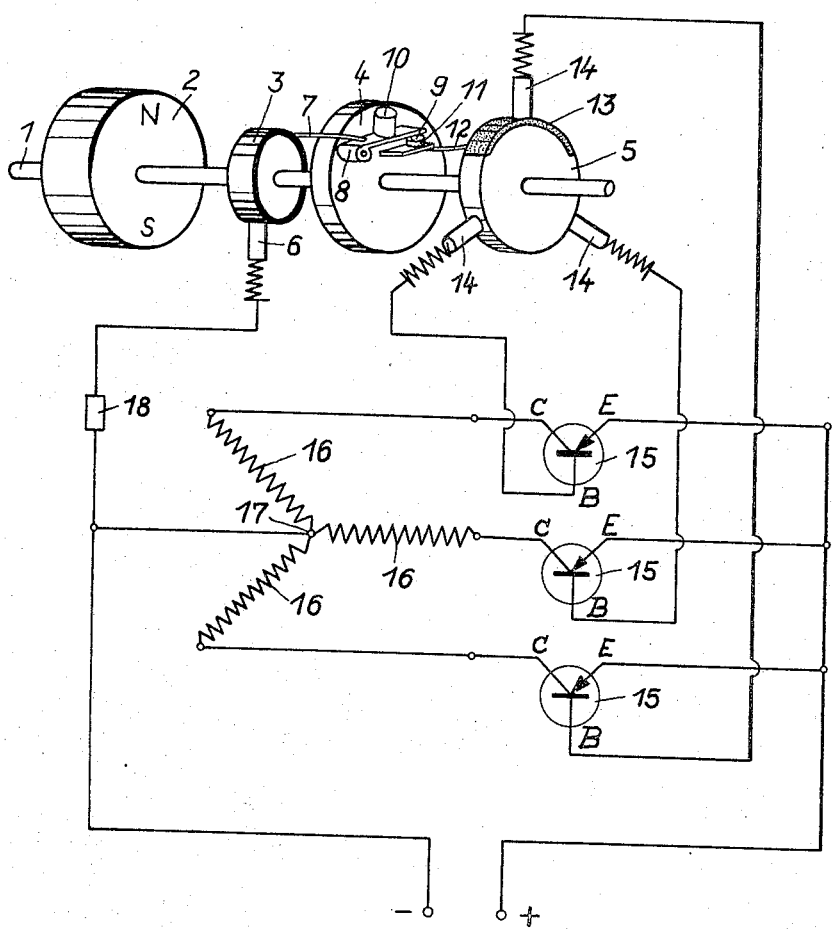

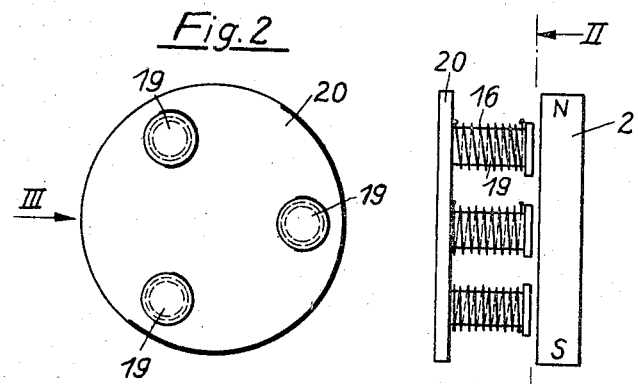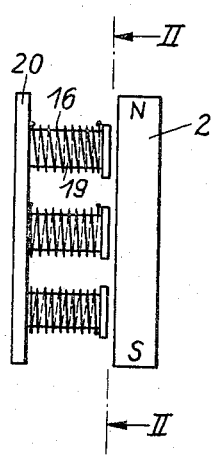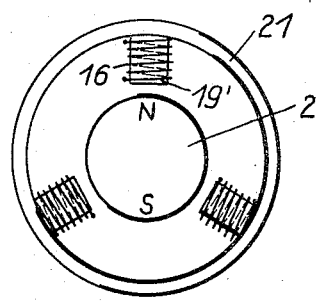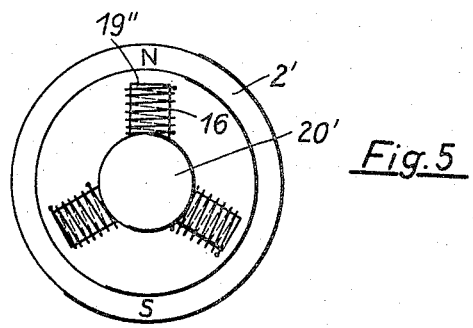

The present invention relates to a direct-current motor, and more particularly to one of a miniature size, which is provided with a centrifugal switch for controlling the speed of the motor.

The conventional direct-current motors of this type have a rotor with windings thereon which are supplied with current by means of a commutator. Even though the friction between this commutator and the associated brushes might be so small as to be of no importance, the arcing between these parts is generally so strong that they are burned off within a short period of operation of the motor. If it were possible to prevent such an arcing between the brushes and the commutator, these parts and thus the entire motor would remain properly operative for a very long time.

It is an object of the present invention to improve the conventional direct-current motors of the above-mentioned type in a manner so as to reduce the arcing between the brushes and the commutator very considerably or even to eliminate it entirely, so that the length of service of the entire motor will be greatly increased.

According to the invention this object is attained by providing the rotor of the direct-current motor in the form of a permanent magnet, by providing the stator with one or more windings which are offset at equal angles relative to each other, and by providing for each winding a separate transistor, the collector-emitter system of which is connected in series with the associated winding and the base of which is connected to a brush associated with a slip ring which is mounted on the motor shaft and has an electrically conductive segment which is connected in series with the centrifugal switch for connecting and disconnecting the windings. Thus, merely the small base current is interrupted at the brushes and the segment of the slip ring or by the contacts of the centrifugal switch, whereby the arcing is reduced to a minimum or eliminated entirely. This means that these contacts and brushes and the segment will last for a very long time and that the entire motor will therefore remain properly operative for a much greater length of time than a motor of the conventional construction.

According to another feature of the invention, the stator of the motor is provided with three windings which are disposed at an angle of 120° relative to each other, the brushes which are connected to the bases of the associated transistors are likewise disposed at an angle of 120° relative to each other, and the segment of the slip ring is made of a length which is smaller in the peripheral direction than the peripheral spacing of which the brushes from each other. By this construction the advantage is attained that a rotating field is thereby produced which runs in synchronism with the rotor.

Another feature of the invention consists in providing the stator windings either in a position adjacent to the rotor in the axial direction thereof or outside or inside of the stator magnet as seen in the radial direction thereof. In the last-mentioned case, the stator magnet may be provided in the form of a ring.

The features and advantages of the present invention will become more clearly apparent from the following detailed description thereof which is to be read with reference to the accompanying drawings, in which—

FIGURE 1 shows a diagrammatic perspective illustration of a direct current motor according to the invention and the circuit diagram thereof;

FIGURE 2 shows a front view of a stator as seen in the direction of the arrows II—II in FIGURE 3;

FIGURE 3 shows a side view of the stator according to FIGURE 2, as seen in the direction of the arrow III and of the associated rotor;

FIGURE 4 shows a diagrammatic front view of a modification of the stator and rotor with the stator windings being disposed outside of the rotor and extending radially toward the rotor; while FIGURE 5 shows a diagrammatic front view of a further modification of the stator and rotor with the stator winding being disposed within the annular rotor and extending radially toward the rotor.

The direct current motor according to the invention as illustrated diagrammatically in FIGURE 1 comprises a motor shaft 1 on which a rotor 2 in the form of a permanent magnet, a slip ring 3, an insulating disk 4 carrying the centrifugal switch, and a disk 5 forming a further slip ring are rigidly secured. The slip ring 3 is in sliding engagement with a brush 6 and connected by a conductor 7 to a lever 8 of the centrifugal switch. This lever 8 is pivotally mounted at one end on the disk 4 and it carries on its other end a contact 9 and at its center a flyweight 10. The movable contact 9 engages under the action of a spring, not shown, upon a fixed contact 11 of the centrifugal switch, and which is connected by a conductor 12 to an electrically conductive segment 13 which is secured to and sunk into the insulating disk 5 of the second slip ring so that its outer surface is flush with the outer peripheral surface of this insulating disk 5. The common outer peripheral surface of disk 5 and segment 13 is in sliding engagement with three brushes 14 which are disposed at an angle of 120° to each other and are connected by suitable conductors to the bases B of three transistors 15. The collectors C and the emitters E of the transistors 15 are connected in series with three stator windings 16 which are disposed at an angle 120° relative to each other and are electrically connected to each other at 17. This connecting point 17 is, in turn, connected through a resistance 18 to the brush 6 of the slip ring 3 and also to the negative pole of a source of direct current. The emitters E of the transistors 15 are electrically connected to each other and to the positive pole of the same source of current.

During the rotation of the rotor 2, the base B of one transistor 15 after another will be connected to the segment 13 so that the respective stator winding 16 will be energized. This results in a rotating field in the windings 16 of the stator, which drives the rotor 2. If the speed of the motor increases beyond a certain value, the contacts 9 and 11 of the centrifugal switch are opened so that for a moment no current will be supplied to the stator windings and the speed of the motor will therefore decrease. Consequently, the contacts 9 and 11 are again closed so that the stator windings are again energized and the motor runs again at its normal speed. By providing suitable adjusting means on the centrifugal switch, it is therefore possible to operate the motor at a constant speed independently of the torque thereof and of the voltage supplied thereto.

As illustrated in FIGURES 2 and 3, the individual windings 16 of the stator may extend in the axial direction thereof, and be wound on the cores 19 which are secured to a circular disk 20 so as to project in the axial direction therefrom.

FIGURE 4 shows a modification of the invention in which the cores 19' are secured to a ring 21 so as to project radially toward the inside thereof. The windings 16 on the cores 19' are therefore disposed radially outside of the rotor 2.

According to the further modification of the invention as shown in FIGURE 5, the rotor 2' is provided in the form of an annular magnet which surrounds the windings 16 which extend in radial directions and are wound on the cores 19" which are secured to a cylinder 20'.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A direct-current motor comprising, in combination, a shaft; a rotor on said shaft consisting of a permanent magnet; a centrifugal switch on said shaft having a pair of contacts controlling the speed of said motor to maintain a constant speed thereof; a stator having a plurality of windings disposed at equal angular intervals from each other around said shaft adjacent said rotor; a respective single transistor operatively associated with each respective stator winding, each transistor having a collector-emitter system connected in series with the associated respective stator winding and with a source of potential, and each transistor having a base; a slip ring secured on said shaft and including an electrically conductive segment connected to one contact of said centrifugal switch; a respective brush for each respective transistor, each brush being electrically connected with the base of the associated transistor; said brushes being disposed at equal angular spacings around said shaft and bearing on said slip ring and the conductive segment thereof; and means connecting each of said stator windings to the other contact of said centrifugal switch; whereby the contacts of said centrifugal switch, when opened, interrupt only the relatively weak base currents of said transistors so that sparking of said contacts is substantially eliminated.

2. A direct-current motor as defined in claim 1, wherein said stator carries three of said windings disposed at an angle of 120° to each other and associated with three transistors, said brushes connected to the bases of said three transistors being likewise disposed at an angle of 120° to each other, said segment on said slip ring having a peripheral length smaller than the peripheral spacing of the adjacent brushes.

3. A direct-current motor as defined in claim 1, wherein said stator windings extend parallel to the axis of said shaft and are located adjacent to said rotor.

4. A direct-current motor as defined in claim 1, wherein said stator comprises a ring surrounding said rotor, said windings being mounted on said ring and extending radially toward said rotor.

5. A direct-current motor as defined in claim 1, wherein said stator comprises a cylindrical member, said windings being mounted on said member and extending radially therefrom, said rotor consisting of an annular magnet surrounding said windings.

References Cited

UNITED STATES PATENTS

| 2,722,649 | 11/1955 | Immel et al. | |
| 3,058,045 | 10/1962 | Feindt | 318—325 |
| 3,200,315 | 8/1965 | Thompson | 318—138 |
| 3,229,179 | 1/1966 | Hetzel | 318—138 |
| 3,239,739 | 3/1966 | Scholl | 317—325 X |
| 3,257,593 | 6/1966 | Schlossar | 318—138 |

FOREIGN PATENTS 641,778  8/1950  Great Britain.

ORIS L. RADER, *Primary Examiner.*

J. BERERZWEIG, J. J. BAKER, *Assistant Examiners.*